United States Patent
Leckie

(10) Patent No.: US 9,009,187 B2
(45) Date of Patent: Apr. 14, 2015

(54) ASSIGNING TASKS TO THREADS REQUIRING LIMITED RESOURCES USING PROGRAMMABLE QUEUES

(75) Inventor: Michael Andrew Kyle Leckie, Kitchener (CA)

(73) Assignee: iAnywhere Solutions, Inc., Dublin, CA (US)

( * ) Notice: Subject to any disclaimer, the term of this patent is extended or adjusted under 35 U.S.C. 154(b) by 1875 days.

(21) Appl. No.: 11/640,853

(22) Filed: Dec. 19, 2006

(65) Prior Publication Data

US 2008/0148271 A1 Jun. 19, 2008

(51) Int. Cl.
*G06F 17/30* (2006.01)
*G06F 9/50* (2006.01)
*G06F 9/48* (2006.01)

(52) U.S. Cl.
CPC ............ *G06F 9/5027* (2013.01); *G06F 9/4881* (2013.01); *G06F 2209/485* (2013.01); *G06F 2209/5011* (2013.01); *G06F 2209/5018* (2013.01)

(58) Field of Classification Search
CPC .................... G06F 17/30041; G06F 17/30011; G06F 17/30917; G06F 17/30067; G06F 17/30929; G06F 17/30938; G06F 2209/5018
USPC ............ 707/10, 104.1, 999.01, 999.107, 802, 707/799, 764, 912, 769; 709/201, 202, 203
See application file for complete search history.

(56) References Cited

U.S. PATENT DOCUMENTS

| | | | | |
|---|---|---|---|---|
| 6,006,249 | A * | 12/1999 | Leong | 718/107 |
| 6,988,139 | B1 * | 1/2006 | Jervis et al. | 709/226 |
| 7,194,543 | B2 * | 3/2007 | Robertson et al. | 709/226 |
| 7,328,192 | B1 * | 2/2008 | Stengard et al. | 706/12 |
| 7,565,651 | B1 * | 7/2009 | Carey | 718/100 |
| 2001/0000194 | A1 * | 4/2001 | Sequeira | 725/39 |
| 2004/0202165 | A1 * | 10/2004 | Aoki et al. | 370/392 |
| 2005/0028158 | A1 * | 2/2005 | Ferguson et al. | 718/100 |
| 2006/0248034 | A1 * | 11/2006 | Soderberg et al. | 707/1 |
| 2006/0282509 | A1 * | 12/2006 | Kilian et al. | 709/217 |
| 2007/0136374 | A1 * | 6/2007 | Guedalia | 707/104.1 |
| 2007/0203882 | A1 * | 8/2007 | Koseki et al. | 707/2 |
| 2008/0015839 | A1 * | 1/2008 | Noureldin et al. | 703/18 |
| 2009/0031311 | A1 * | 1/2009 | Chang et al. | 718/101 |
| 2009/0320025 | A1 * | 12/2009 | Ferguson et al. | 718/100 |

OTHER PUBLICATIONS

International Search Report for International Application No. PCT/US07/25723 mailed May 29, 2008.
Search Report and Written Opinion for International Application No. PCT/US07/25723 mailed May 29, 2008, 5 pgs.

* cited by examiner

*Primary Examiner* — Thanh-Ha Dang

(74) *Attorney, Agent, or Firm* — Sterne, Kessler, Goldstein & Fox P.L.L.C.

(57) ABSTRACT

Systems, methods and computer program products for assigning tasks to threads in a server process, where many threads require access to limited resources, are described herein. The system includes one or more programmable queues. Enqueued in each queue are a plurality tuples that correspond to tasks. The invention attempts to match the tuples with command processing resources and database command resources, as needed and available. Once a tuple is fully populated, the tuple is dequeued and assigned to a thread for processing. After processing of the tuple is complete, its command processing resource and any database command resource are enqueued to make them available to other tuples.

25 Claims, 10 Drawing Sheets

ASSIGNING TASKS TO THREADS REQUIRING LIMITED RESOURCES USING PROGRAMMABLE QUEUES

BACKGROUND OF THE INVENTION

1. Field of the Invention

The present invention is generally directed to processing tasks that require access to limited resources.

2. Background Art

FIG. 1 illustrates a mobile workforce environment 102 that includes a server 106 and a number of mobile clients 110. Mobile clients 110 are part of a mobile workforce and must, from time to time, sync with an enterprise database 104.

Database 104 represents a limited resource because only a finite number of threads may interact with it at any given time. In other words, there is a maximum number of concurrent active connections to database 104 that may exist at any given time.

Server 106 may receive sync requests 108A-108N from multiple clients 110 at the same time. The number of such sync requests may exceed the number of allowed concurrent active connections to database 104. When this occurs, server 106 must efficiently process the sync requests and, in so doing, efficiently allocate database resources among the threads serving the sync requests. Otherwise, system performance will degrade.

There are a variety of prior art approaches for scheduling tasks and allocating/locking resources. These prior approaches are flawed for a number of reasons. For example, some approaches require a custom, non-generic task scheduler that must have knowledge of the tasks which it will enqueue/dequeue. Other approaches require a great number of threads. Still other approaches require internal queues that are owned by threads/jobs.

Accordingly, what is needed is an improved approach for processing tasks that require access to limited resources. More particularly, what is needed is an improved approach for assigning tasks to threads in a server process, where threads may require access to limited resources.

BRIEF SUMMARY OF THE INVENTION

The present invention is directed to systems, methods and computer program products for assigning tasks to threads in a server process, where many threads require access to limited resources. The invention is also directed to generic configurable queues for achieving this functionality.

Briefly stated, an embodiment of the invention includes a plurality of programmable queues. Enqueued in each queue are a plurality tuples that correspond to tasks. The invention attempts to match the tuples with command processing resources and database command resources, as needed and available. Once a tuple is fully populated, the tuple is dequeued and assigned to a thread for processing. After processing of the tuple is complete, its command processing resource and any database command resource are enqueued to make them available to other tuples.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
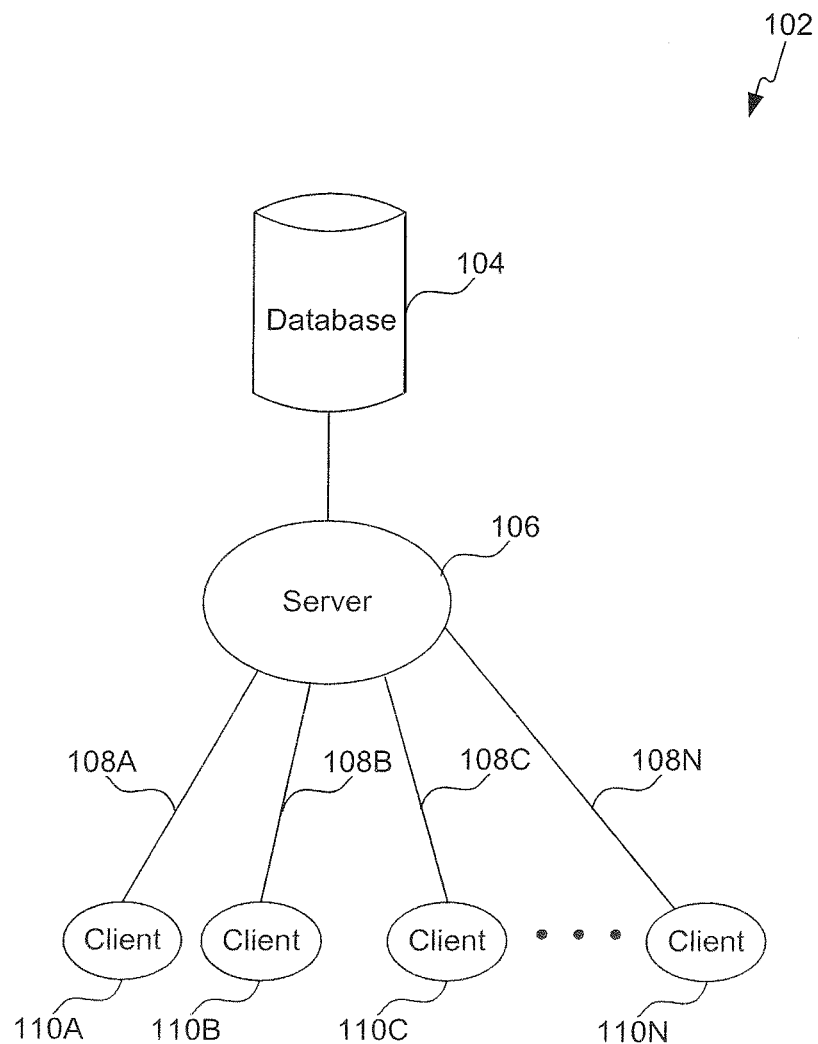
FIG. 1 illustrates an example mobile workforce environment according to an embodiment of the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

The present invention is directed to systems, methods and computer program products for assigning tasks to threads in a server process, where threads may require access to limited resources. The invention is also directed to generic configurable (programmable) queues for achieving this functionality.

Embodiments of the invention enjoy a number of advantages over prior approaches, including but not limited to:

(1) A task is not assigned until it is immediately serviceable.

(2) Non-queue lists of tasks are not needed.

(3) Tasks may be allocated based on the job which contains the task.

(4) The server can create a constant number of threads without regard to the number of jobs.

The invention is applicable to a mobile workforce environment where mobile clients periodically sync with an enterprise server, such as the example shown in FIG. 1. However, this example is provided herein for illustrative purposes only, and is not limiting. The invention is applicable to any computing application where tasks are assigned to threads for processing, and at times such processing requires access to limited resources, such as but not limited to a database having a maximum number of concurrent active connections.

Figure 2:
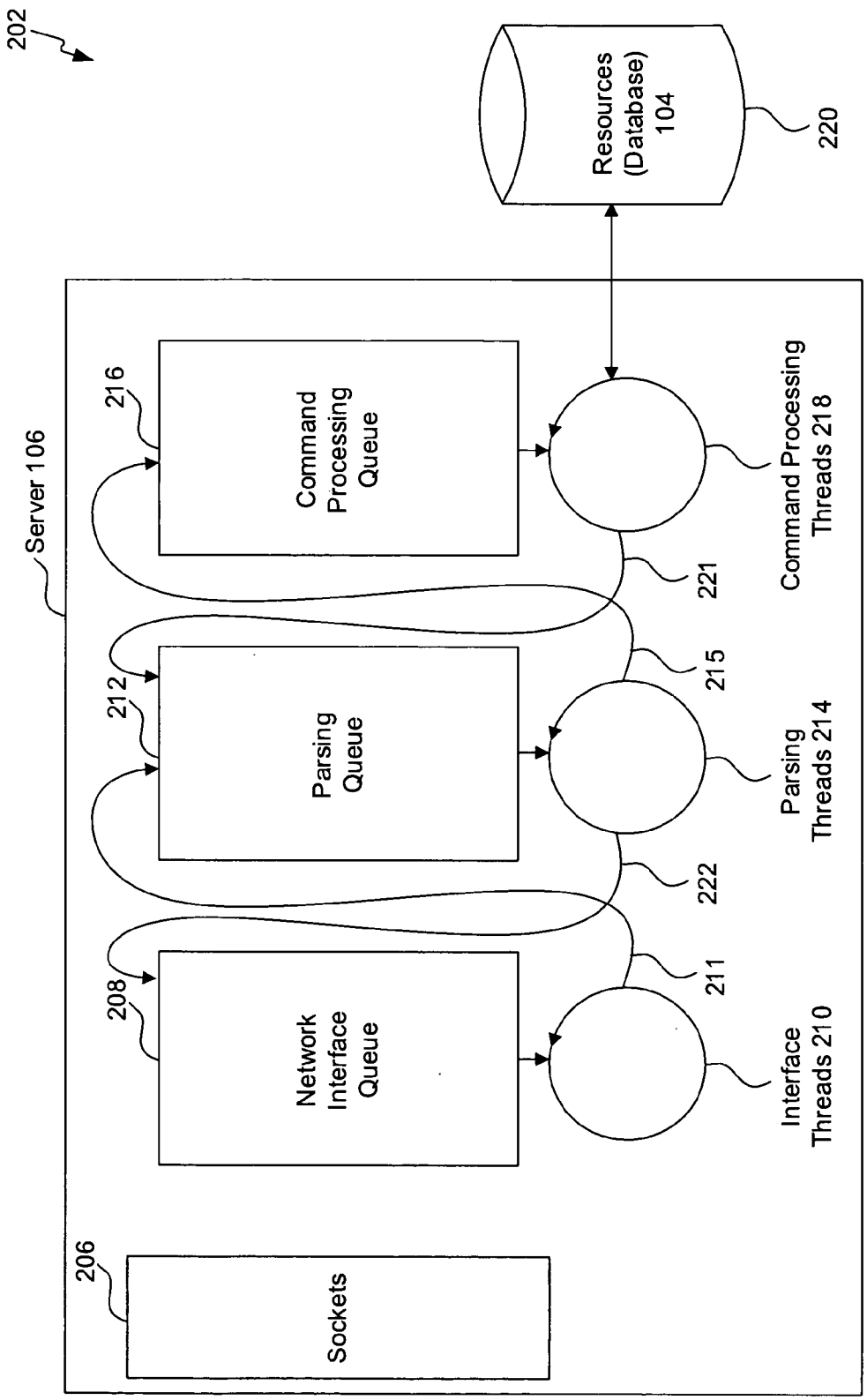
FIG. 2 illustrates a block diagram of a server according to an embodiment of the invention.

FIG. 2 illustrates system 202 that includes an example server 106 according to an embodiment of the present invention. Server 106 includes a number of task-specific queues, such as a network interface queue 208, a parsing queue 212 and a command processing queue 216. While these queues are task specific, they are also generic, because they do not require knowledge of the tasks that they will enqueue/dequeue. As described below, these queues 208, 212, 216 are programmable using tuple definitions (also called tuple templates).

Threads are associated with each queue. For example, interface threads 210 are associated with network interface queue 208, parsing threads 214 are associated with parsing queue 212, and command processing threads 218 are associated with command processing queue 216.

Tasks are enqueued into queues 208, 212, 216 and eventually dequeued and processed by associated threads 210, 214, 218. In the example of FIG. 2, interface threads 210 (when processing tasks dequeued from network interface queue 208) read bytes (data) from clients 110 over a network via sockets 206. These bytes (sometimes called network bytes herein) are passed to the parsing queue 212, as indicated by data flow line 211. Parsing threads 214 (when processing tasks dequeued from parsing queue 212) parse these bytes into commands. These commands are passed to the command processing queue 216, as indicated by data flow line 215. Command processing threads 218 (when processing tasks dequeued from command processing queue 216) process these commands. Depending on the particular command, such processing may require access to limited resources 220, such as database 104.

As indicated by data flow line 221, command processing threads 218 pass the results of their respective processing to parsing queue 212. Parsing threads 212 encode such results in forms appropriate for respective clients 110, and pass the encoded data to network interface queue 208 (as indicated by data flow line 222). Interface threads 210 transfer such encoded data to respective clients 110 via sockets 206.

It is noted that the example of FIG. 2 is provided for illustrative purposes only, and is not limiting. The invention is applicable to other server architectures employing other queue/thread configurations, as will be apparent to persons skilled in the relevant art(s) based on the teachings provided herein.

According to embodiments of the invention, server 106 processes jobs. For example, a sync operation may correspond to a job. Each job includes several tasks. As described above, these tasks are enqueued in queues 208, 212, 216, and eventually dequeued and processed by threads 210, 214, 218.

Embodiments of the invention enforce two dequeueing rules. Regarding the first dequeueing rule, note that multiple tasks associated with a particular job may be enqueued in queues 208, 212, 216 at the same time. In certain cases, serialization of tasks associated with a given job may be necessary for proper operation of the job. An embodiment of the invention achieves task serialization by dequeueing and allowing only a single task for a given job to be performed at any given time. In an embodiment, this restriction is applied on a per queue basis. For example, at any given time, command processing threads 218 may dequeue and process only a single task for any given job. However, for example, parsing thread 214 is allowed to process a task for a given job at the same time that command processing thread 218 is processing a different task for that job.

Regarding the second dequeueing rule, note that server 106 may be processing multiple jobs at the same time, where many of those jobs may be contending for the same limited resources 220. According to an embodiment, a task that requires access to a given limited resource is not dequeued and processed by a thread until that resource becomes available. As a result, according to an embodiment of the invention, the number of tasks of a given resource type (i.e., tasks that require a given resource) that can be dequeued and simultaneously processed is equal to the number of available resources of that type.

Figure 3:
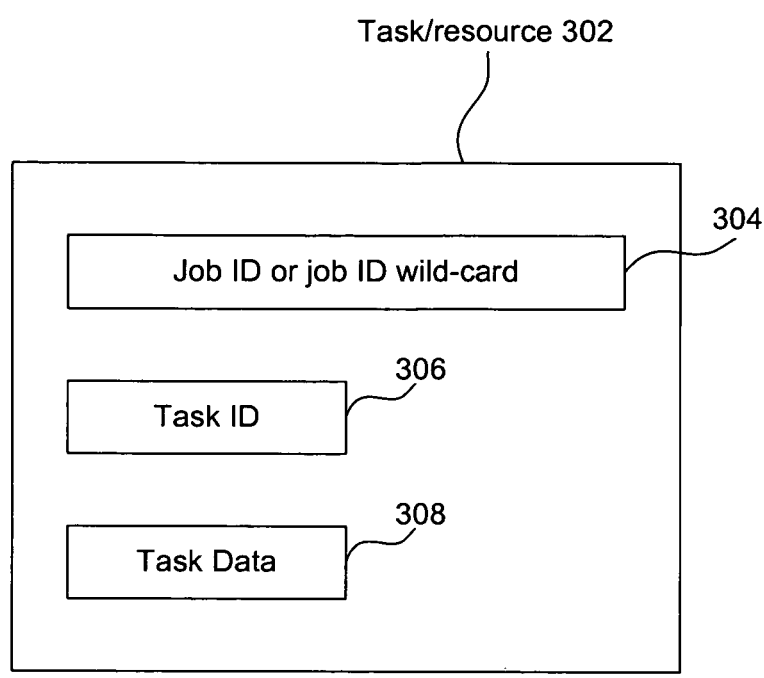
FIG. 3 illustrates the format of tasks and resources according to an embodiment of the invention.

The invention enforces these dequeueing rules, as well as achieves the other Advantages described herein, by defining a set of task/resource rules and properties, as Well as particular thread behavior. In particular, each task and resource includes the fields Shown in Table 1 (see also FIG.3). FIG. 3 illustrates task/resource 302 that includes job ID (or job ID wild-card) 304, task ID 306 and task data 308, according to an embodiment.

TABLE 1

Format of Task and Resource job ID or job ID wild-card: This is the identification of the associated job. If this field includes a job ID wild-card, then the task/resource applies to any job. For example, if a resource has a job ID wild-card, then it will match with tasks of all jobs.
    task ID: This is the identification of the task, or task class. This field enables resources to be task specific. For example, if the task ID of a given resource is Task1, then the resource will only match with tasks having task ID equaling Task1.
    task data: This field contains data needed to process the task. According to embodiments of the invention, this field may be utilized by threads 210, 214, 218 when processing tasks, but is not utilized by queues 208, 212, 216 when assigning tasks to threads (accordingly, the queues 208, 212, 216 are generic queues).

The thread behavior mentioned above is represented by a set of tuple definitions which are passed to a queue to control the queue's dequeue behavior. Accordingly, the queues of the present invention are programmable, where the programming of the queues is achieved via the use of tuple definitions.

Table 2 lists example tuple definitions according to an embodiment of the invention. Other tuples will be apparent to persons skilled in the relevant arts based on the teachings provided herein.

TABLE 2

Example Tuple Definitions non-database command task tuple:  (non-database command task, command processing resource)

TABLE 2-continued

Example Tuple Definitions

| | |
|---|---|
| database command task tuple: | (database command task, command processing resource, database command resource) |
| done processing task tuple: | (done processing task, command processing resource) |

A non-database command task tuple corresponds to a task that does not need access to a limited resource 220. A non-database command task tuple can be dequeued and processed only once the matching command processing resource becomes available. The command processing resource is a token for a particular job, and is created in the format of Table 1 and placed in the queue when the job is created. A task associated with the job can be processed only once it has the command processing resource for the job (in other words, when it has the matching command processing resource). For example, assume a client 110A initiates a new synchronization operation with server 106. Server 106 would create a command processing resource for this job, and would place the command processing resource in the command processing queue 216. A non-database command task tuple for a task related to this job can be dequeued from command processing queue 216 and processed by a command processing thread 218 only once it has the job's command processing resource. Since only one command processing resource for any given job is placed in the command processing queue 216, only one task for a given job can be processed at any given time by command processing threads 218. Accordingly, use of command processing resources enables the invention to enforce the first dequeueing rule described above.

It is noted that alternative embodiments of the invention can enable parallel operation of multiple tasks for a given job by placing multiple command processing resources in a queue. For example, if three command processing resources for a sync job are placed in command processing queue 216, then command processing threads 218 can simultaneously process three tasks related to the sync job.

A database command task tuple corresponds to a task that requires access to a limited resource 220. A database command task tuple can be dequeued and processed only once (1) the command processing resource becomes available, and (2) the required limited resource 220 becomes available. The limited resource 220 may be a database connection, but the invention is not limited to this example.

According to an embodiment of the invention, whenever a limited resource 220 is created, a database command resource is created in the format of Table 1. The database command resource is placed in the queue. Since a database command task can be dequeued and processed only once it has the appropriate database command resource (as well as the matching command processing resource), use of database command resources enables the invention to enforce the second dequeueing rule described above. For example, assume five concurrent active connections to database 104 are allowed. The server 106 would place five database command resources representative of these five database connections into command processing queue 216. Since database command tasks are dequeued and processed only once they hold matching database command resources, it is not possible for more than five database command tasks to be dequeued and concurrently processed at any given time.

A done processing task tuple is used to asynchronously terminate a job. To prevent non-deterministic operation, processing of any active tasks of the job should be allowed to complete before the job is terminated. Accordingly, a done processing task tuple is not dequeued from any given queue until it receives the job's command processing resource. Since only one command processing resource is created for any given job (on a per queue basis), this requirement guarantees that the done processing task tuple is not dequeued and processed until processing of all active tasks related to the job complete.

Figure 4:
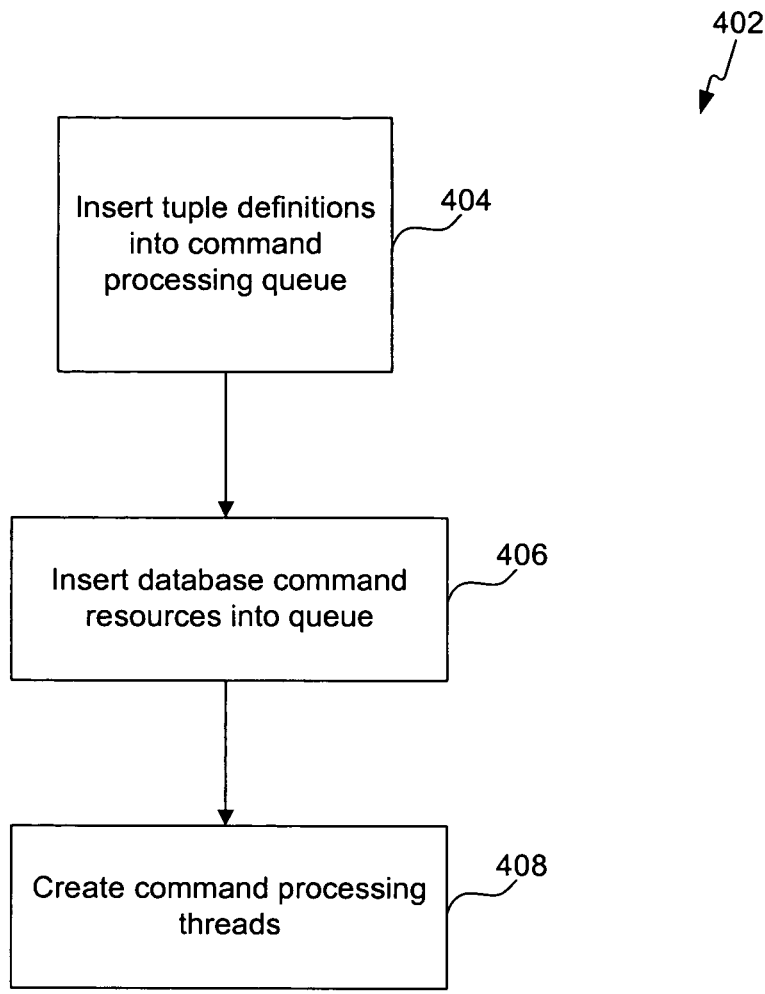
FIG. 4 is a flowchart representing a start-up/initialization process according to an embodiment of the invention.

Operation of the invention shall now be further described with reference to FIG. 4, which illustrates a start-up/initialization flowchart 402. In the following, server 106 is described as performing the steps of flowchart 402. In practice, the steps of flowchart 402 may be performed by any module or component (or portion thereof) of server 106 (this is also true of the flowcharts shown in FIGS. 5-9, unless indicated otherwise).

In step 404, server 106 inserts one or more tuple definition sets into the command processing queue 216. According to an embodiment of the invention, a tuple definitition set includes the three tuples shown in Table 2, although the invention is not limited to this example. Other tuples for other functions and applications will be apparent to persons skilled in the relevant art(s) based on the teachings provided herein.

In step 406, server 106 creates a number of database connection resources, and enqueues them in the command processing queue 216. The number of database connection resources created is equal to the maximum number of allowed concurrent active connections to database 104. It is noted that the invention is applicable to limited resources 220 of all types, not just database connections. Modifications to the invention to accommodate other types of limited resources 220 will be apparent to persons skilled in the relevant art(s) based on the teachings provided herein.

In step 408, server 106 creates a number of command processing threads 218. Initially, at startup, these threads 218 are idle since the tuple definitions enqueued in step 404 are not ready for dequeueing.

The process for determining whether tuples are ready for dequeueing and assigning to command processing threads 218 is described below with reference to FIG. 8. However, FIGS. 5-7 shall first be considered.

Figure 5:
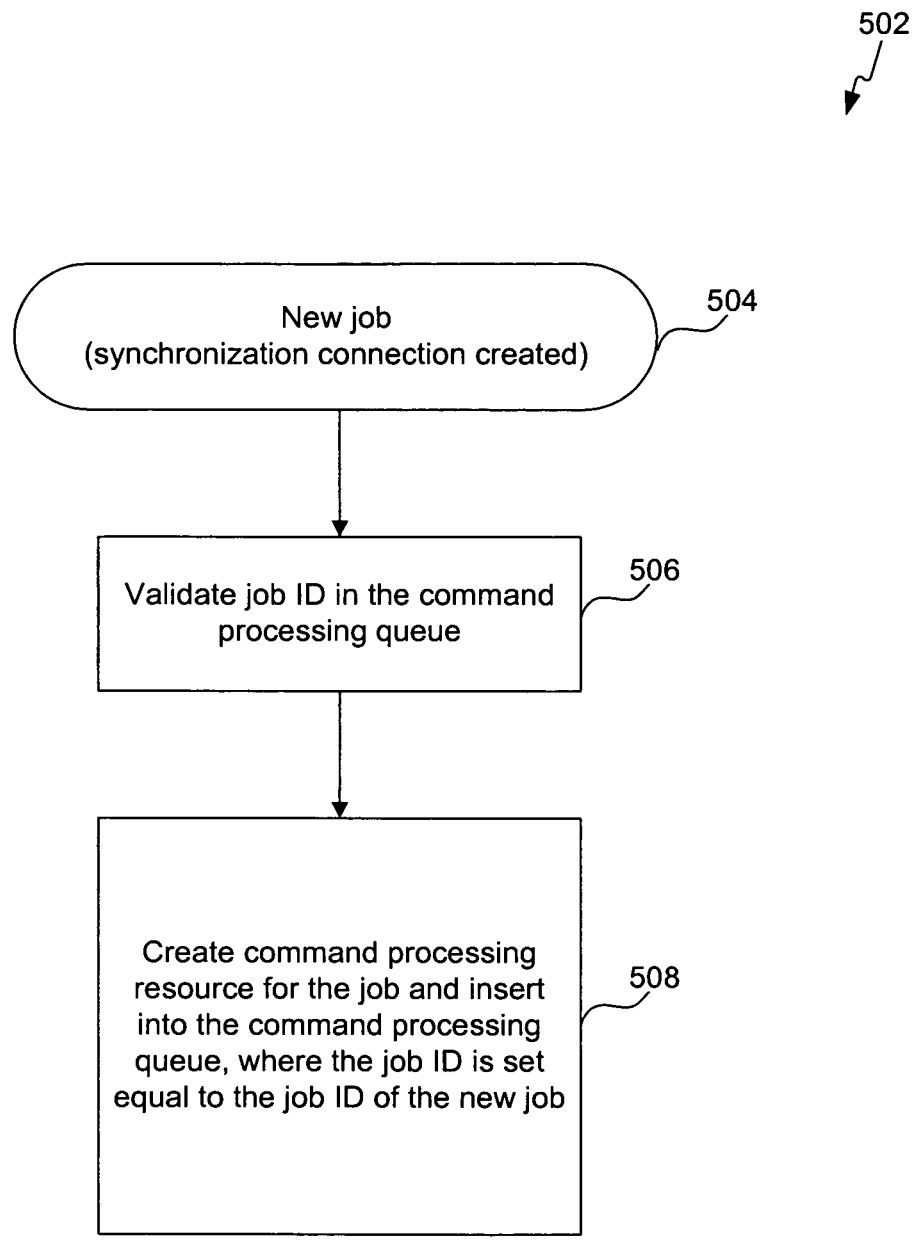
FIG. 5 is a flowchart representing operation of an embodiment of the invention when a new job is created.

FIG. 5 illustrates a flowchart 502 representing the operation of server 106 when a new job is created, such as when a synchronization connection is created. (step 504). In step 506, server 106 validates the job ID for the new job in the command processing queue 216. As long as the job ID is valid, tasks related to the job will be processed by command processing threads 218.

In step 508, server 106 creates a command processing resource for the new job, using the format shown in Table 1, and enqueues the new command processing resource in the command processing queue 216. The job ID of the new command processing resource is set equal to the job ID of the new job.

Figure 6:
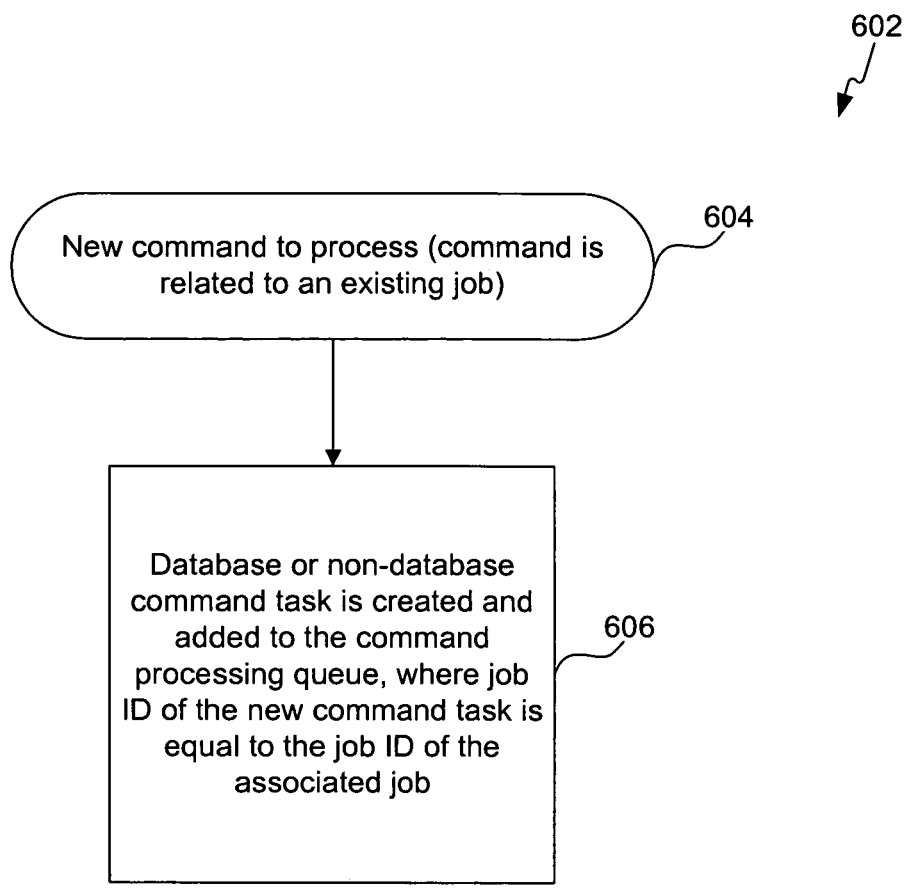
FIG. 6 is a flowchart representing operation of an embodiment of the invention when a new command is read from a network.

FIG. 6 illustrates a flowchart 602 representing the operation of server 106 when either a database or non-database command is read from the network. (step 604). More particularly, according to an embodiment, flowchart 602 represents the operation of a parsing thread 214 when it parses either a database or non-database command from network data received from a client 110 via a socket 206.

In step 606, the parsing thread 214 creates either a database or non-database command task using the format shown in Table 1. Whether a database or non-database command task is created depends on the network data parsed by the parsing thread 214. The job ID is set equal to the job ID of the job to which the task is a part of. The task ID is set equal to the ID of the task. In an embodiment, the task ID identifies the class of the task. The task data is set based on other network data parsed by the parsing thread 214. The parsing thread 214 enqueues the new database or non-database command task in the command processing queue 216.

Figure 7:
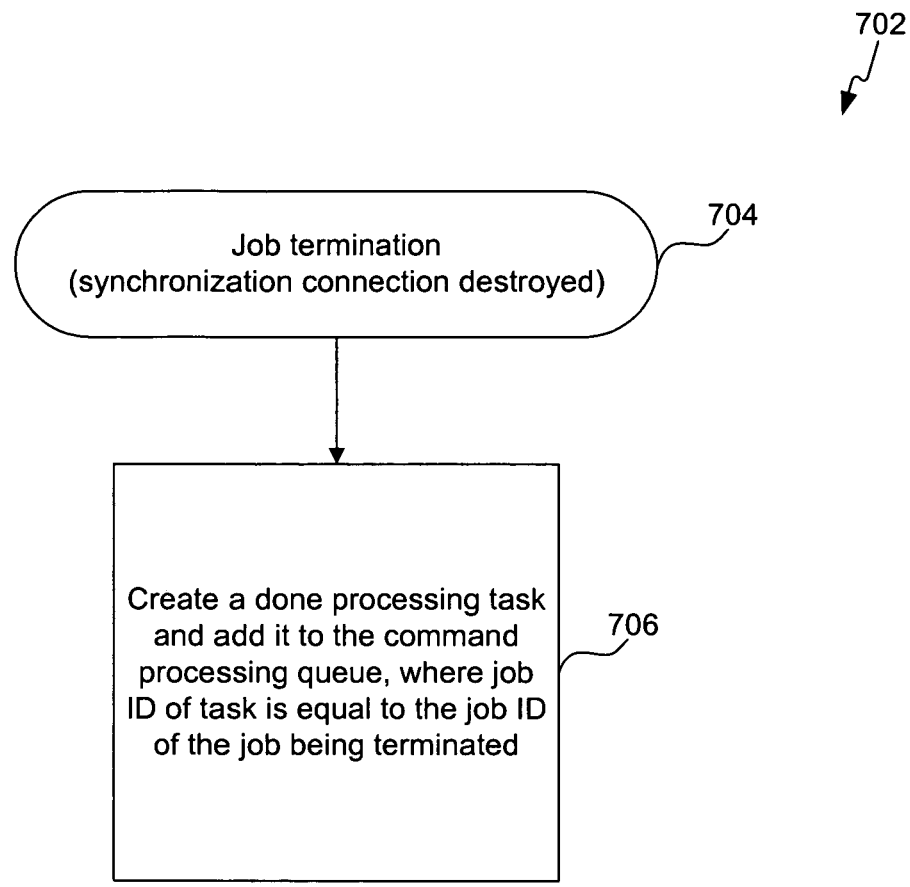
FIG. 7 is a flowchart representing operation of an embodiment of the invention when a job is terminated.

FIG. 7 illustrates a flowchart 702 representing the operation of server 106 when a synchronization connection is destroyed (step 704). More generally, flowchart 702 represents the operation of server 106 when an active job is to be asynchronously terminated. In step 706, server 106 creates a done processing task using the format shown in Table 1. The job ID is set equal to the job ID of the job that is to be terminated. The server 106 enqueues the new done processing task in the command processing queue 216.

Figure 8:
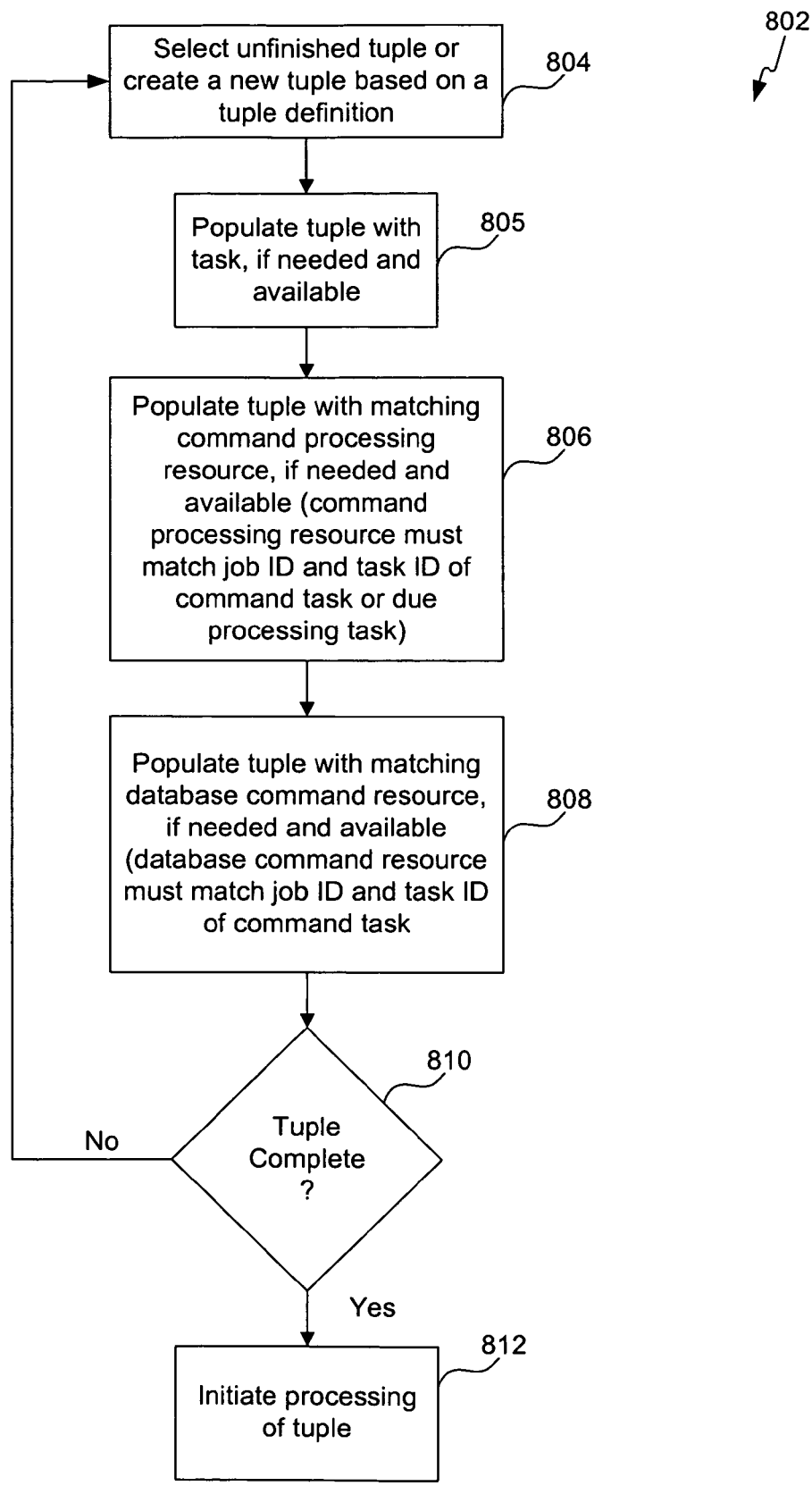
FIG. 8 is a flowchart representing a process for determining whether a tuple (corresponding to a task) is ready for assignment to a thread, according to an embodiment of the invention.

FIG. 8 illustrates a flowchart 802 for determining whether tuples are ready for dequeueing and assigning to command processing threads 218 for processing. The steps of flowchart 802 may be performed whether an object is enqueued into command processing queue 216, or whenever particular objects are enqueued into command processing queue 216, or according to some other implementation specific approach.

In step 804, server 106 selects an unfinished tuple from the command processing queue 216 or creates a tuple based on a tuple definition to process. As used herein, an "unfinished tuple" is a tuple having at least one unpopulated field.

In step 805, server 106 populates the selected tuple with a task, if one is needed by the selected tuple and available in the command processing queue 216. For example, assume the selected tuple is a database command task tuple. In step 805, server 106 determines whether the "database command task" field of the selected tuple is empty or filled with a database command task. If it is already filled, then processing continues to step 806. If it is empty, then server 106 checks to see if a database command task exists in the command processing queue 216 (recall that database command tasks were created and enqueued according to the processing of flowchart 602 of FIG. 6). If a database command task exists, then server 106 populates the "database command task" field of the selected tuple with that database command task.

In step 806, server 106 populates the selected tuple with a matching command processing resource, if one is needed by the selected tuple and available in the command processing queue 216. As used herein, a "matching command processing resource" is a command processing resource whose job ID and task ID match that of the selected tuple's task. For example, assume the selected tuple is a database command task tuple. In step 806, server 106 determines whether the "command processing resource" field of the selected tuple is empty or filled with a command processing resource. If it is already filled, then processing continues to step 808. If it is empty, then server 106 checks to see if a command processing resource exists in the command processing queue 216 whose job ID and task ID match that of the task indicated in the "database command task" field of the selected tuple (recall that command processing resources were created and enqueued according to the processing of flowchart 502 of FIG. 5). If a matching command processing resource exists, then server 106 populates the "command processing resource" field of the selected tuple with that command processing resource.

In step 808, server 106 populates the selected tuple with a matching database command resource, if one is needed by the selected tuple and available in the command processing queue 216. As used herein, a "matching database command resource" is a database command resource whose job ID and task ID match that of the selected tuple's task. For example, assume the selected tuple is a database command task tuple.

In step 808, server 106 determines whether the "database command resource" field of the selected tuple is empty or filled with a database command resource. If it is already filled, then processing continues to step 810. If it is empty, then server 106 checks to see if a database command resource exists in the command processing queue 216 whose job ID and task ID match that of the task indicated in the "database command task" field of the selected tuple (recall that database command resources were created and enqueued in step 406 of FIG. 4). If a matching database command resource exists, then server 106 populates the "database command resource" field of the selected tuple with that database command resource.

It is noted that a database command resource that has a job ID wild-card will match all jobs. It is also noted that step 808 is not necessary for non-database command task tuples and done processing task tuples, since they do not require a database command resource.

In step 810, server 106 determines whether the selected tuple is complete (i.e., whether all of the fields of the selected tuple are populated). If the selected tuple is complete, then processing of the selected tuple is initiated in step 812. Such processing is described further below with respect to FIG. 9. If the selected tuple is not complete, then the selected tuple remains in the command processing queue 216 for consideration at a later time, and processing returns to step 804, where the server 106 selects another unfinished tuple for consideration.

Figure 9:
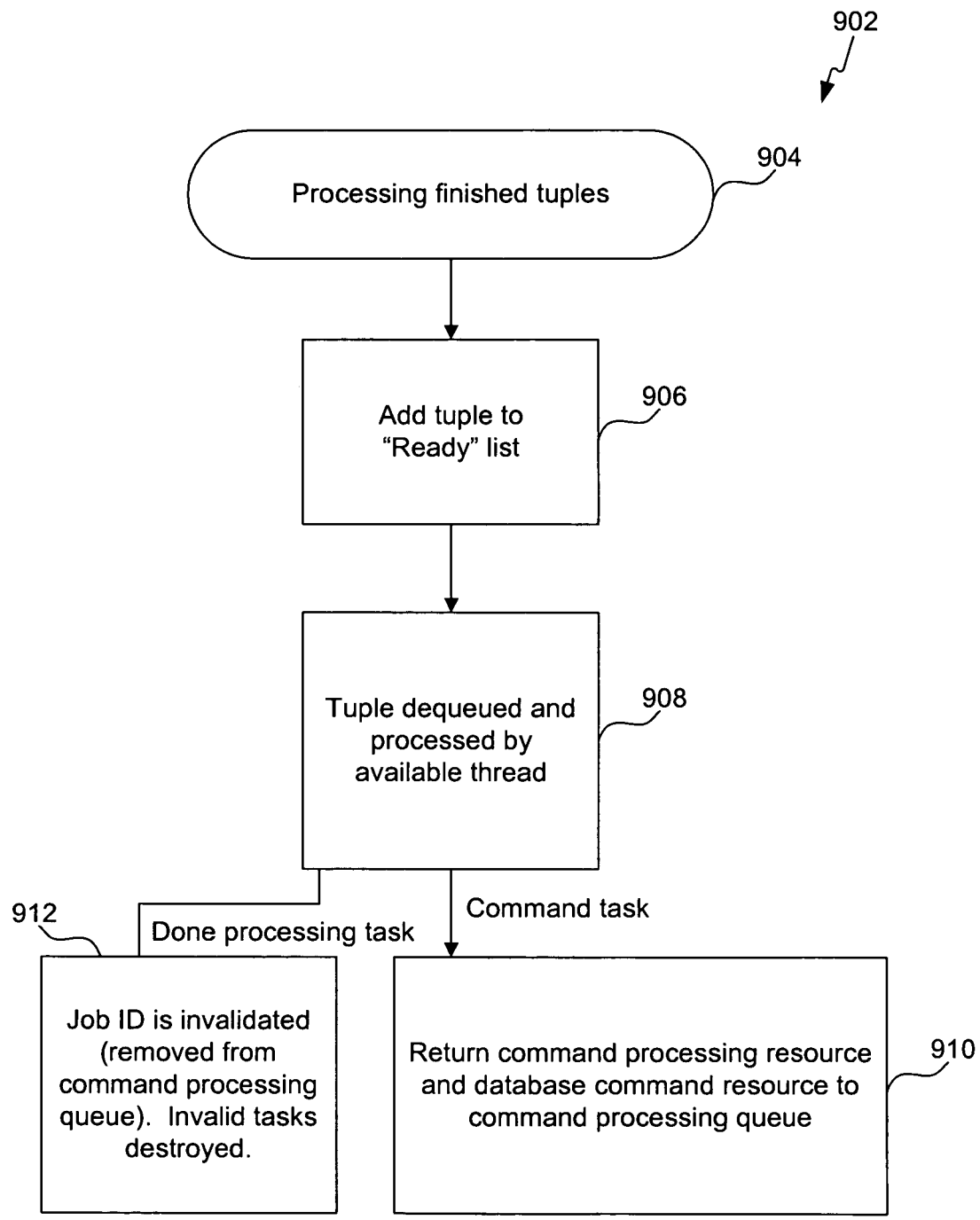
FIG. 9 is a flowchart representing a process for processing a finished tuple, according to an embodiment of the invention.

FIG. 9 illustrates a flowchart 902 representing the operation of the server 106 when processing finished tuples. (step 904).

In step 906, server 106 adds the finished tuple to a "ready" list in the command processing queue 216. Step 906 may be implemented by maintaining a list, setting flags, or using any other means to indicate that the finished tuple is ready for assignment to a command processing thread 218 for processing.

In step 908, when a command processing thread 218 becomes available, server 106 dequeues the finished tuple from the command processing queue 216, and assigns the tuple to the available command processing thread 218. Since the tuple already has all of its required resources, it can be processed as soon as it is dequeued. Accordingly, the command processing thread 218 processes the tuple (i.e., processes the task associated with the tuple) in a well known manner.

Further processing of flowchart 902 depends on whether the tuple is for a command task (either a non-database command task tuple or a database command task tuple), or a done processing task (i.e., a done processing task tuple). If the tuple is for a command task, then step 910 is performed. In step 910, after processing of the tuple is complete, server 106 returns the tuple's command processing resource and database command resource (if any) to the command processing queue 216. Accordingly, such command processing resource and database command resource are made available to any unfinished tuples (see flowchart 802 in FIG. 8).

If the tuple is for a done processing task, then step 912 is performed. In step 912, server 106 invalidates the job ID of the job to be terminated. Also, the command processing resource is not returned to the command processing queue 216. As a result, no tasks associated with the job will be processed in the future by command processing threads 218.

Example Computer Implementation

Figure 10:
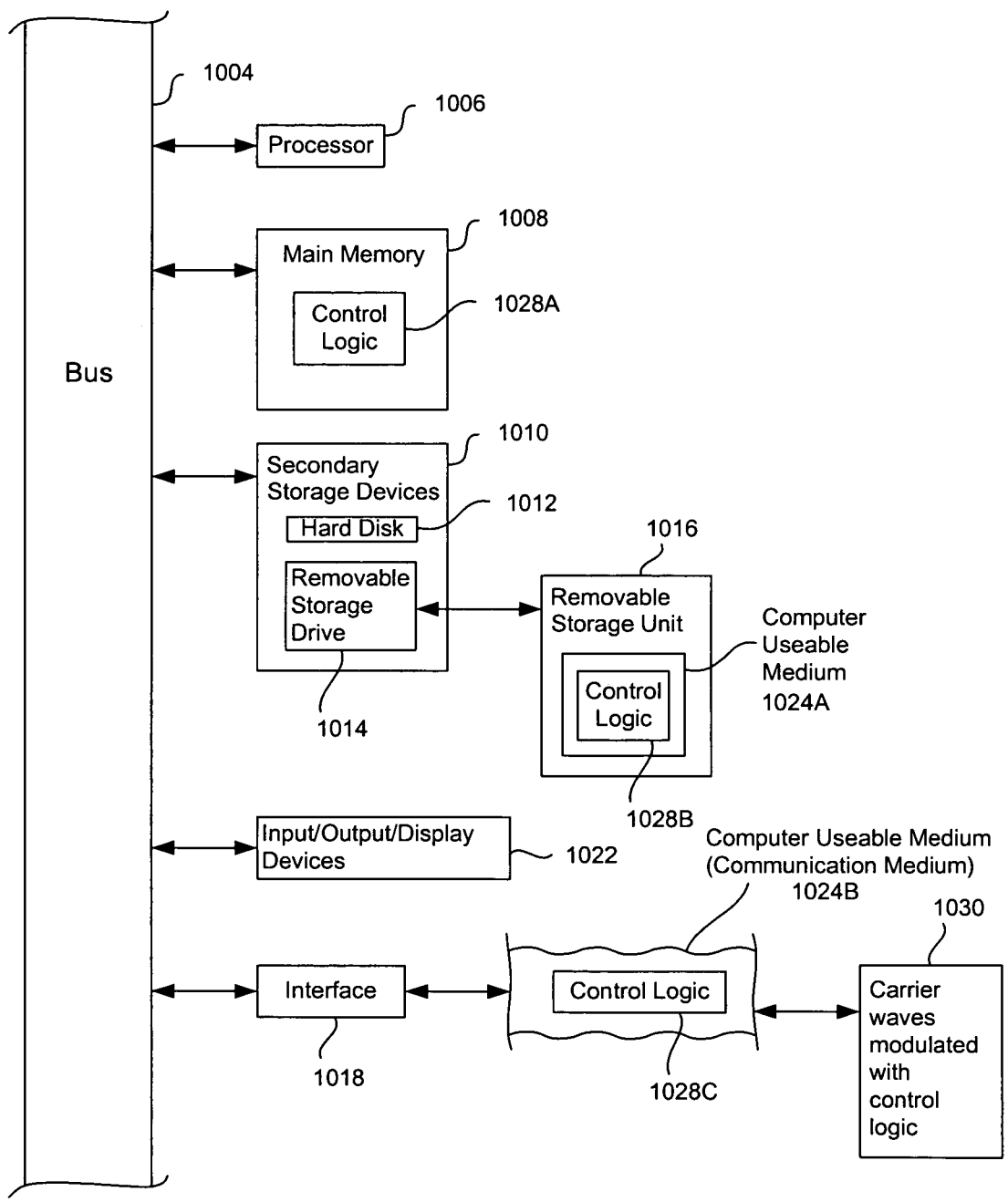
FIG. 10 is a block diagram of an example computer useful for implementing components of the invention.

In an embodiment of the present invention, the system and components of the present invention described herein are implemented using well known computers, such as computer 1002 shown in FIG. 10. For example, clients 110 and server 106 can be implemented using computers 1002.

The computer 1002 can be any commercially available and well known computer capable of performing the functions described herein, such as computers available from International Business Machines, Apple, Sun, HP, Dell, Compaq, Digital, Cray, etc.

The computer 1002 includes one or more processors (also called central processing units, or CPUs), such as a processor 1006. The processor 1006 is connected to a communication bus 1004.

The computer 1002 also includes a main or primary memory 1008, such as random access memory (RAM). The primary memory 1008 has stored therein control logic 1028A (computer software), and data.

The computer 1002 also includes one or more secondary storage devices 1010. The secondary storage devices 1010 include, for example, a hard disk drive 1012 and/or a removable storage device or drive 1014, as well as other types of storage devices, such as memory cards and memory sticks. The removable storage drive 1014 represents a floppy disk drive, a magnetic tape drive, a compact disk drive, an optical storage device, tape backup, etc.

The removable storage drive 1014 interacts with a removable storage unit 1016. The removable storage unit 1016 includes a computer useable or readable storage medium 1024A having stored therein computer software 1028B (control logic) and/or data. Removable storage unit 1016 represents a floppy disk, magnetic tape, compact disk, DVD, optical storage disk, or any other computer data storage device. The removable storage drive 1014 reads from and/or writes to the removable storage unit 1016 in a well known manner.

The computer 1002 also includes input/output/display devices 1022, such as monitors, keyboards, pointing devices, etc.

The computer 1002 further includes a communication or network interface 1018. The network interface 1018 enables the computer 1002 to communicate with remote devices. For example, the network interface 1018 allows the computer 1002 to communicate over communication networks or mediums 1024B (representing a form of a computer useable or readable medium), such as LANs, WANs, the Internet, etc. The network interface 1018 may interface with remote sites or networks via wired or wireless connections.

Control logic 1028C may be transmitted to and from the computer 1002 via the communication medium 1024B. More particularly, the computer 1002 may receive and transmit carrier waves (electromagnetic signals) modulated with control logic 1030 via the communication medium 1024B.

Any apparatus or manufacture comprising a computer useable or readable medium having control logic (software) stored therein is referred to herein as a computer program product or program storage device. This includes, but is not limited to, the computer 1002, the main memory 1008, the secondary storage devices 1010, the removable storage unit 1016 and the carrier waves modulated with control logic 1030. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer based method comprising:
    assigning a tuple template to a queue, the tuple template comprising a plurality of fields including at least a task field, a command processing resource field, and a database command resource field, wherein the tuple template (i) configures the queue to selectively process jobs and (ii) controls thread operation on the jobs;
    determining that at least one of the plurality of fields of the tuple template is empty;
    identifying a task, a command processing resource, or a database command processing resource that matches the at least one empty field;
    populating the at least one empty field of the tuple template with at least one of the task, the command processing resource, or the database command resource; and
    assigning the tuple template to a thread for processing in response to the at least one empty field of the tuple being populated.

2. The computer based method of claim 1, wherein the tuple template is specific to one of a non-database command task tuple and database command task tuple, further comprising:
    enqueueing the command processing resource and the database command resource once processing of the tuple template is complete, when the tuple template is specific to a database command task tuple; and
    enqueueing the command processing resource once processing of the tuple template is complete, when the tuple template is specific to a non-database command task tuple.

3. The computer based method of claim 1, wherein the tuple template is specific to a done processing task tuple, further comprising:
    invalidating a job associated with the done processing task tuple;
    wherein the command processing resource is not enqueued once the tuple template is complete.

4. The computer based method of claim 1, wherein the populating comprises:
    populating the tuple template with a command processing resource having at least one of a job ID and task ID matching that of a task associated with the tuple template.

5. The computer based method of claim 1, wherein the populating comprises:
    populating the tuple template with a database command resource having at least one of a job ID and task ID matching that of a task associated with the tuple template.

6. The computer based method of claim 1, further comprising a start-up process, the start-up process comprising:
    enqueueing one or more tuple definition sets;
    enqueueing one or more database command resources; and
    creating one or more threads.

7. The computer based method of claim 6, wherein a number of the database command resources is less than or equal to a number of allowed concurrent database connections.

8. The computer based method of claim 1, further comprising:
enqueueing the command processing resource for a new job.

9. The computer based method of claim 1, further comprising:
parsing a command from network data and
enqueueing a task corresponding to the command.

10. A computer based system of assigning tasks to threads, comprising:
a first module configured to assigning a tuple template to a queue, the tuple template comprising a plurality of fields including at least a task field, a command processing resource field, and a database command resource field wherein the tuple template (i) configures the queue to selectively process jobs and (ii) controls thread operation on the jobs;
a second module configured to determine that at least one of the plurality of fields of the tuple template is empty;
a third module configured to identify a task, a command processing resource, or a database command processing resource that matches the at least one empty field;
a fourth module configured to populate the at least one empty field of the tuple template with at least one of the task, the command processing resource and the database command resource: and
a fifth module configured to assign the tuple template to a thread for processing in response to the at least one empty field of the triple template being populated, wherein the first module, the second module, the third module, the fourth module and the fifth module are implemented on one or more processors.

11. The computer based system of claim 10, further comprising:
a sixth module configured to enqueue the command processing resource arid the database command resource once processing of the tuple template is complete, when the tuple template is specific to a database command task tuple; and
a seventh module configured to enqueue the command processing resource once processing of the tuple template is complete, when the tuple template is specific to a non-database command task tuple.

12. The computer based system of claim 10, further comprising:
an eighth module configured to invalidate a job associated with a done processing task tuple template.

13. The computer based system of claim 10, further comprising:
a ninth module configured to populate the tuple template with a command processing resource having at least one of a job ID and task ID matching that of a task associated with the tuple template.

14. The computer based system of claim 10, further comprising:
a tenth module configured to populate the tuple template with a database command resource having at least one of a job ID and task ID matching that of a task associated with the tuple template.

15. The computer based system of claim 10, further comprising:
an eleventh module configured to enqueue one or more tuple definition sets;
a twelfth module configured to enqueue one or more database command resources; and
a thirteenth module configured to create one or more threads.

16. The computer based system of claim 15, wherein a number of the database command resources is less than or equal to a number of allowed concurrent database connections.

17. The computer based system of claim 10, further comprising:
a fourteenth module configured to enqueue a command processing resource for a new job.

18. The computer based system of claim 10, further comprising:
a fifteenth module configured to parse a command from network data; and
a sixteenth module configured to enqueue a task corresponding to the command.

19. An article of manufacture including a non-transitory computer-readable medium having instructions stored thereon that, when executed by a computing device, cause the computing device to perform operations comprising:
assigning a tuple template to a queue, the tuple template comprising a plurality of fields including at least a task field, a command processing resource field, and a database command resource field, wherein the tuple template (i) configures the queue to selectively process jobs and (ii) controls thread operation on the jobs;
determining that at least one of the plurality of fields of the tuple template is empty;
identifying a task, a command processing resource, or a database command processing resource that matches the at least one empty field;
populating the at least one empty field of the tuple template with at least one of the task, the command processing resource, or the database command resource; and
assigning the tuple template to a thread for processing in response to the at least one empty field of the tuple being populated.

20. The article of manufacture of claim 19, wherein the tuple template is specific to one of a non-database command task tuple and database command task tuple, the operations further comprising:
enqueueing the command processing resource and the database command resource once processing of the tuple template is complete, when the tuple template is specific to a database command task tuple; and
enqueueing the command processing resource once processing of the tuple template is complete, when the tuple template is specific to a non-database command task tuple.

21. The article of manufacture of claim 19, wherein the tuple template is specific to a done processing task tuple, the operations further comprising:
invalidating a job associated with the done processing task tuple template,
wherein the command processing resource is not enqueued once the tuple template is complete.

22. The article of manufacture of claim 19, the populating comprising:
populating the tuple template with a command processing resource having at least one of a job ID and task ID matching that of a task associated with the tuple template.

23. The article of manufacture of claim 19, the populating comprising:

populating the tuple template with a database command resource having at least one of a job ID and task ID matching that of a task associated with the tuple template.

24. The article of manufacture of claim 19, the operations further comprising:
enqueueing one or more tuple definition sets;
enqueueing one or more database command resources; and
creating one or more threads.

25. The article of manufacture of claim 24, wherein a number of the database command resources is less than or equal to a number of allowed concurrent database connections.

\* \* \* \* \*